(No Model.)

C. W. TITUS.
CUTTER HEAD.

No. 371,529. Patented Oct. 11, 1887.

WITNESSES:
Jas. F. Kelly
L. Douville

INVENTOR:
Charles W. Titus
BY Niederheim & Kintner
ATTORNEY.

UNITED STATES PATENT OFFICE.

CHARLES W. TITUS, OF PHILADELPHIA, PENNSYLVANIA, ASSIGNOR OF ONE-HALF TO JOSEPH O. COLLADAY, OF SAME PLACE.

CUTTER-HEAD.

SPECIFICATION forming part of Letters Patent No. 371,529, dated October 11, 1887.

Application filed May 6, 1887. Serial No. 237,307. (No model.)

*To all whom it may concern:*

Be it known that I, CHARLES W. TITUS, a citizen of the United States, residing in the city and county of Philadelphia, State of Pennsylvania, have invented a new and useful Improvement in Molding-Cutters, which improvement is fully set forth in the following specification and accompanying drawings.

My invention relates to improvements in molding-cutters; and it consists in an improved form of cutter with detachable and adjustable blades or cutters.

It also consists in an improved beveled collar, which prevents the cutter from choking, and in certain details, hereinafter enumerated, and particularly pointed out in the claims which follow this specification.

Figure 1:
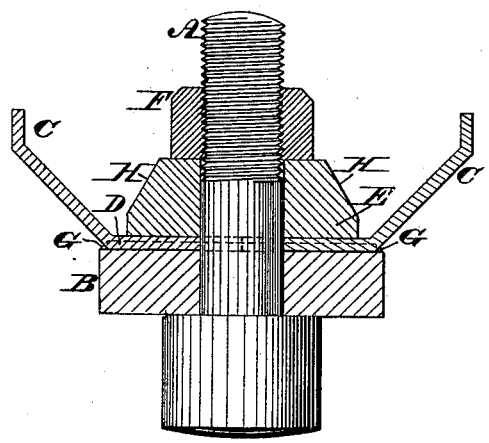
Figure 2:
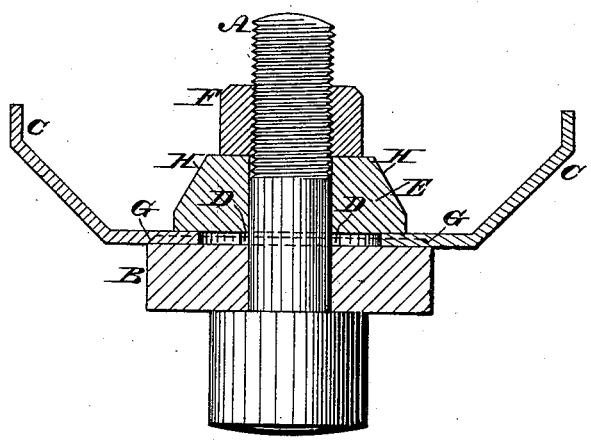
Figure 3:

Figure 1 is a cross-section of my improved molding-cutter, taken through the spindle or chuck, guide-collar, and cutter-arms. Fig. 2 is a similar cross-section, showing the cutter-arms extended outward. Fig. 3 is a detail perspective view of one of the cutter-arms.

Similar letters of reference indicate corresponding parts in the several figures.

Prior to my invention it was customary to provide different cutters and guide collars for the same pattern of molding, differing only in proportions. Those cutters were solid in form and provided usually with three cutter-arms radially disposed. It will be understood that such a form of cutter was necessarily expensive to make, and that the use of separate cutters also added increased cost. With my invention I avoid these objectionable features.

Referring to the drawings, A is the spindle or chuck, being integral, if desired, with the guide-collar B. C C are the cutter arms or blades of any desired pattern. In this instance there are two of these arms; but it is obvious there may be four or any other number, it being preferable to arrange them in pairs. These arms are adapted to fit into a channel, D, in the upper surface of the guide-collar B, and are held in place at any desired point by the yoke or loose beveled collar E, which is thus firmly held down by the nut F on the upper end of the spindle or chuck A. The guide-collar B is beveled at G, as is the loose collar E at H, for preventing the cutter from choking.

The operation of my improved molding-cutter is as follows: The parts are connected, as in Fig. 1, for cutting one pattern and depth of molding. When it is desired to cut another depth of molding, I simply loosen the nut F and adjust the cutter-arms C C laterally a sufficient distance to give to the molding the desired depth, the lateral adjustment being the same for both cutter-arms. It will be seen that this adjustment avoids the use of a separate collar, such as is usual on known forms of molding-cutters. The beveled faces of the fixed collar B and loose retaining-collar D prevent the cutters from choking and constitute an especial feature of my invention. I may do away with the nut F by making the beveled collar D square or octagonal at its upper end, screw-threading it internally, so as to fit the male screw or spindle of chuck A.

It is obvious that my improved molding-cutter possesses many advantages—as, for instance, simplicity and cheapness. It makes it possible to sharpen the cutter-blades and easily restore one when broken. It avoids useless extra molding-collars and saves time in the simple mode of manipulating it.

Having thus described my invention, what I claim as new, and desire to secure by Letters Patent, is—

1. A molding-cutter having a spindle and a fixed guide-collar with a beveled face, in combination with cutter-blades and a collar and nut for retaining said blades in position, substantially as described.

2. A molding-cutter having a spindle and a fixed guide-collar with beveled face, in combination with adjustable cutter-blades and a beveled retaining-collar, substantially as described.

3. A molding-cutter having a spindle and a fixed guide-collar and one or more laterally-adjustable cutter-blades, in combination with a beveled retaining-collar and a nut for holding the parts together, substantially as described.

CHARLES W. TITUS.

Witnesses:
JOHN A. WIEDERSHEIM,
A. P. JENNINGS.